United States Patent [19]

Clark et al.

[11] Patent Number: 4,574,242

[45] Date of Patent: Mar. 4, 1986

[54] ELECTROMAGNETIC LOGGING WITH REDUCTION OF SPURIOUS TRANSVERSE MAGNETIC COMPONENTS

[75] Inventors: Brian Clark, Ridgefield, Conn.; Gerald S. Huchital, Houston, Tex.

[73] Assignee: Schlumberger Technology Corporation, New York, N.Y.

[21] Appl. No.: 391,097

[22] Filed: Jun. 23, 1982

[51] Int. Cl.$^4$ ............................................. G01V 3/30
[52] U.S. Cl. .................................................. 324/338
[58] Field of Search .............. 324/225, 244, 245, 338, 324/339, 340, 341, 342

[56] References Cited

U.S. PATENT DOCUMENTS

| | | | |
|---|---|---|---|
| 3,496,455 | 2/1970 | Gouilloud | 324/339 |
| 4,209,747 | 6/1980 | Huchital | 324/338 |
| 4,386,318 | 5/1983 | Burbank et al. | 324/244 |

Primary Examiner—Gerard R. Strecker
Assistant Examiner—Walter E. Snow
Attorney, Agent, or Firm—Stephen L. Borst; Martin Novack

[57] ABSTRACT

The disclosure is directed to an improved method and apparatus for subsurface electromagnetic logging in a borehole wherein means are provided to detect transverse magnetic mode components and to either correct for these spurious components in the processing of the received signals or to generate suitable cancelling signals.

28 Claims, 8 Drawing Figures

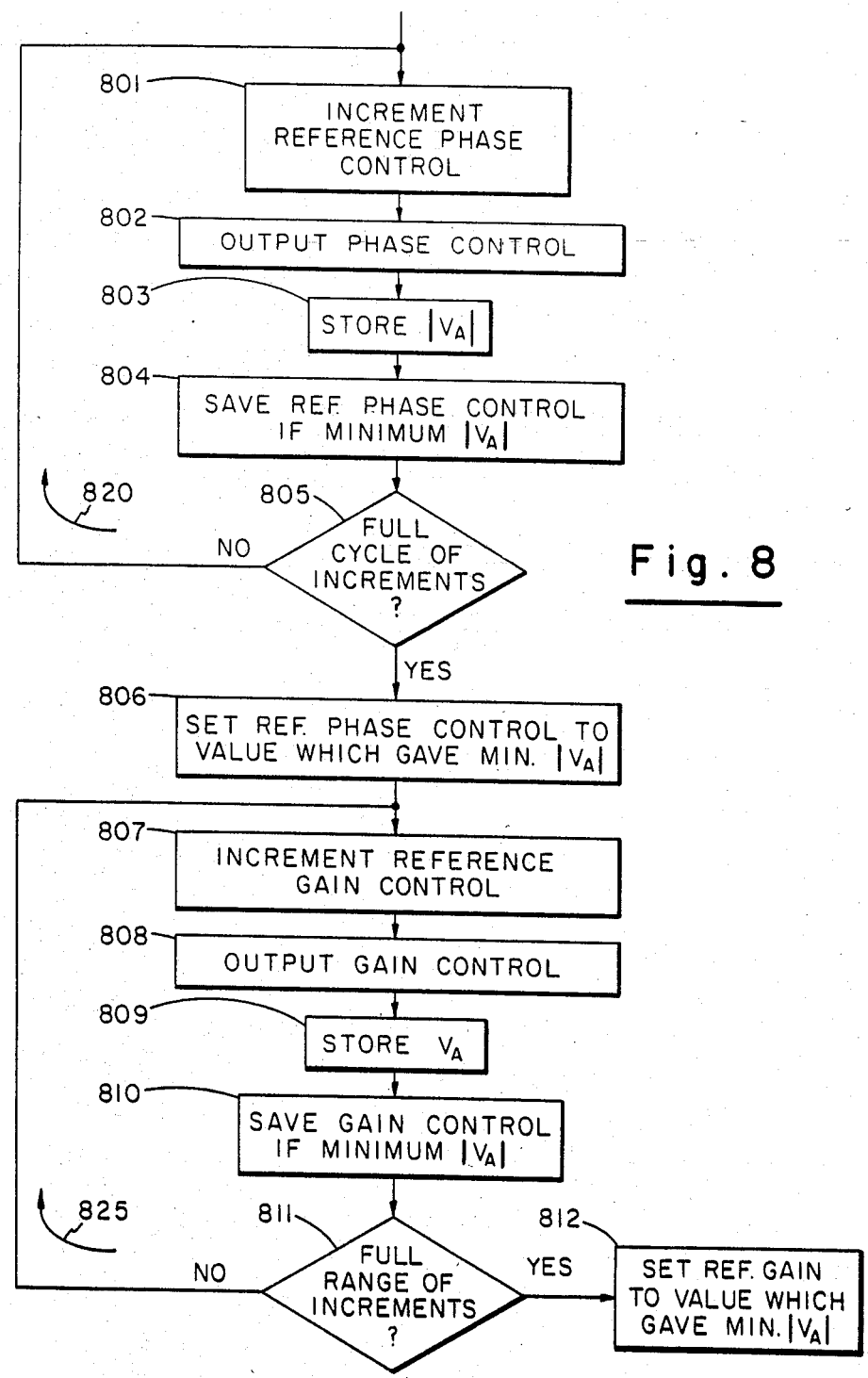

ELECTROMAGNETIC LOGGING WITH REDUCTION OF SPURIOUS TRANSVERSE MAGNETIC COMPONENTS

BACKGROUND OF THE INVENTION

This invention relates to borehole logging devices of the type wherein electromagnetic energy is used for measuring properties of formations surrounding a borehole and, more particularly, to an apparatus and method for use in conjunction with such devices for reducing the effect of spurious modes of the electromagnetic energy. The subject matter of this invention is related to subject matter in copending U.S. patent application Ser. No. 391,096, , filed of even date herewith now U.S. Pat. No. 4,538,109 and assigned to the same assignee as the present application.

Induction logging has been employed for many years for measuring the conductivity of subsurface earth formations surrounding an earth borehole. In conventional induction logging a number of coils are wound on a mandrel. One or more transmitter coils are energized by an alternating current at a frequency such as 20 KHz. The resultant oscillating magnetic field causes induction of circulating currents in the formations which are substantially proportional to its conductivity. These currents, in turn, cause a voltage to be induced in receiver coils, and the conductivity of the formations is determined from the induced voltage.

In recent years logging systems have been proposed for employing radio frequency electromagnetic energy in the range between about 10 MHz and 100 MHz to determine both the dielectric constant and the conductivity of formations surrounding a borehole. In this frequency range, dielectric constant and conductivity both have a substantial effect upon the propagation constant of electromagnetic energy propagating in the formations, so measurements of attenuation and phase can be used for solution of simultaneous equations to determine the dielectric constant and/or conductivity of formations through which the electromagnetic energy has passed. A device of this type is the deep propagation tool ("DPT"), an embodiment of which is described in U.S. Pat. No. 4,209,747. This device includes a transmitting antenna, a "close" receiver antenna pair, and a "far" receiver antenna pair. Each of the transmitter and receiver antennas are coils wound in insulating media mounted on a metal cylindrical pipe which carries wiring to and/or from the coils. Briefly, operation of the DPT logging device involves energizing the transmitter to emit electromagnetic energy at a frequency suitable for determination of both the electrical conductivity and the electrical permittivity of the surrounding formations. A portion of the electromagnetic energy which has traveled through the formations is received at the close and far differential receiver pairs. The signals detected at the far receiver pair are used to determine the phase shift of electromagnetic energy that has passed through the formations, and the signals detected at the close receiver pair are used to determine relative attenuation of the electromagnetic energy. The phase shift and attenuation are then employed to obtain electrical permittivity and electrical conductivity of the formations.

The relatively high frequency electromagnetic energy that is used to obtain the substantial displacement currents needed to measure dielectric properties of the formations attenuates quickly as it travels through the formations. The receivers are typically spaced a substantial distance from the transmitter to attain a significant depth of investigation into the formations. Accordingly, the signal levels received at the receivers (particularly the far receiver pair) tend to be weak, especially in relatively conductive (lossy) formations. Since it is necessary to obtain accurate measurements of the relative attenuation and phase at the receivers, it is desirable to have the signal-to-noise ratio at said receivers be as high as possible. When the received signal is weak, however, as is often the case, the amount of spurious or interfering signal (i.e., "noise") is a limiting factor on the measurement accuracy of the logging device.

There are various phonemena which cause noise at the receivers, but applicant has discovered that there is an important interfering signal in a DPT type of logging device resulting from electromagnetic energy that propagates in the region between the central metal pipe of the device and the borehole fluid of the formations. The energy that propagates in this region has a predominant transverse magnetic component that can be envisioned as propagating in a coaxial type of transmission line. To picture this mode of propagation, the metal cylindrical pipe of the logging device can be thought of as the central conductor of a coaxial line, and the borehole fluid can be thought of as the outer cylindrical conductor of the coax. The region in which the wave propagation takes place is roughly analagous to the air-filled or dielectric-filled region of a coaxial transmission line. [If the borehole fluid is not very conductive (for example, a fresh water-based mud or an oil-based mud), the formations may be thought of as constituting the outer conductor in the coaxial transmission line model.] If the central pipe and the drilling fluid were perfect conductors, the electromagnetic energy propagating in the region therebetween would be a transverse electromagnetic ("TEM") mode wave having a radial electric field and an azimuthal magnetic field. Depending upon the relative conductivity of the outer "conductor" in the coaxial transmission line model (i.e., the borehole fluid, the mudcake, or the formations, as the case may be), the propagating noise mode may comprise another type of electromagnetic wave also having a predominant transverse magnetic component; i.e., a transverse magnetic ("TM") mode electromagnetic wave that includes both radial and axial electric field components, and an azimuthal magnetic field component. The propagating noise modes having a predominant transverse magnetic component (i.e., both the TEM and the TM type modes) will be referred to herein as transverse magnetic modes or components.

If the transmitter and receiver coils were perfectly configured and balanced in a theoretically ideal system, the electromagnetic wave energy generated by the coils would be transverse electric ("TE") mode, of the type generated by an ideal vertical magnetic dipole. However, under actual operating circumstances there is sufficient misalignment, unbalance, or other conditions that give rise to significant undesired transverse magnetic mode. As described hereinabove, the logging device itself in the borehole can act as a coaxial transmission line for transverse magnetic wave energy which can thereby propagate relatively unattenuated between the transmitter and the receivers.

It is an object of the present invention to improve operation in the described type logging devices by substantially reducing the effect of transverse magnetic mode noise.

SUMMARY OF THE INVENTION

The present invention is directed to an improved apparatus and method for subsurface logging in a borehole wherein means are provided to detect transverse magnetic mode components and to either correct for these spurious components in the processing of the received signals or to generate suitable cancelling signals.

In accordance with a form of the method of the invention, electromagnetic energy is transmitted at a first frequency from a main transmitter in the borehole. Transverse magnetic electromagnetic energy is transmitted at a second frequency from an auxiliary transmitter. The transmitted energy is received at a main receiver and at an auxiliary receiver. Transmitted energy received at the main receiver is frequency separated into a first frequency main receiver signal and a second frequency main receiver signal. Also, transmitted energy received at the auxiliary receiver is frequency separated into a first frequency auxiliary receiver signal and a second frequency auxiliary receiver signal. A corrected main receiver signal is then generated as a function of the main receiver signals and the auxiliary receiver signals. The signals received at the main and auxiliary receivers as a result of activation of the auxiliary transmitter can be used to determine the relative sensitivity of these receivers to the transverse magnetic mode component. In this manner, a more accurate corrected main receiver signal can be generated and used to determine properties of formations surrounding the borehole.

In another embodiment of the invention, an auxiliary transmitter with adjustable amplitude and phase is employed to generate transverse magnetic electromagnetic energy that tends to cancel the transverse magnetic component at the receivers. The transverse magnetic component at an auxiliary receiver is detected and used to derive adjustment of the signal from the auxiliary transmitter.

In the copending U.S. patent application Ser. No. 368,922, now U.S. Pat. No. 4,536,714 assigned to the same assignee as the present invention and incorporated herein by reference, there is disclosed a shield for use in conjunction with the transmitter and each receiver of an electromagnetic logging device. The shield substantially reduces transmission and/or reception of spurious signals such as transverse magnetic mode components. The present invention is particularly suitable for use in logging apparatus wherein such shields are employed, and serves to further reduce the presence of spurious mode components that may result from skewing of the shield conductor elements or other imperfections or limitations of the shields.

Further features and advantages of the invention will become more readily apparent from the following detailed description when taken in conjunction with the accompanying drawings.

BRIEF DESCRIPTION OF THE DRAWINGS

FIG. 8 is a flow diagram of the routine of the processing circuitry of FIG. 6.

DESCRIPTION OF THE PREFERRED EMBODIMENTS

Figure 1:
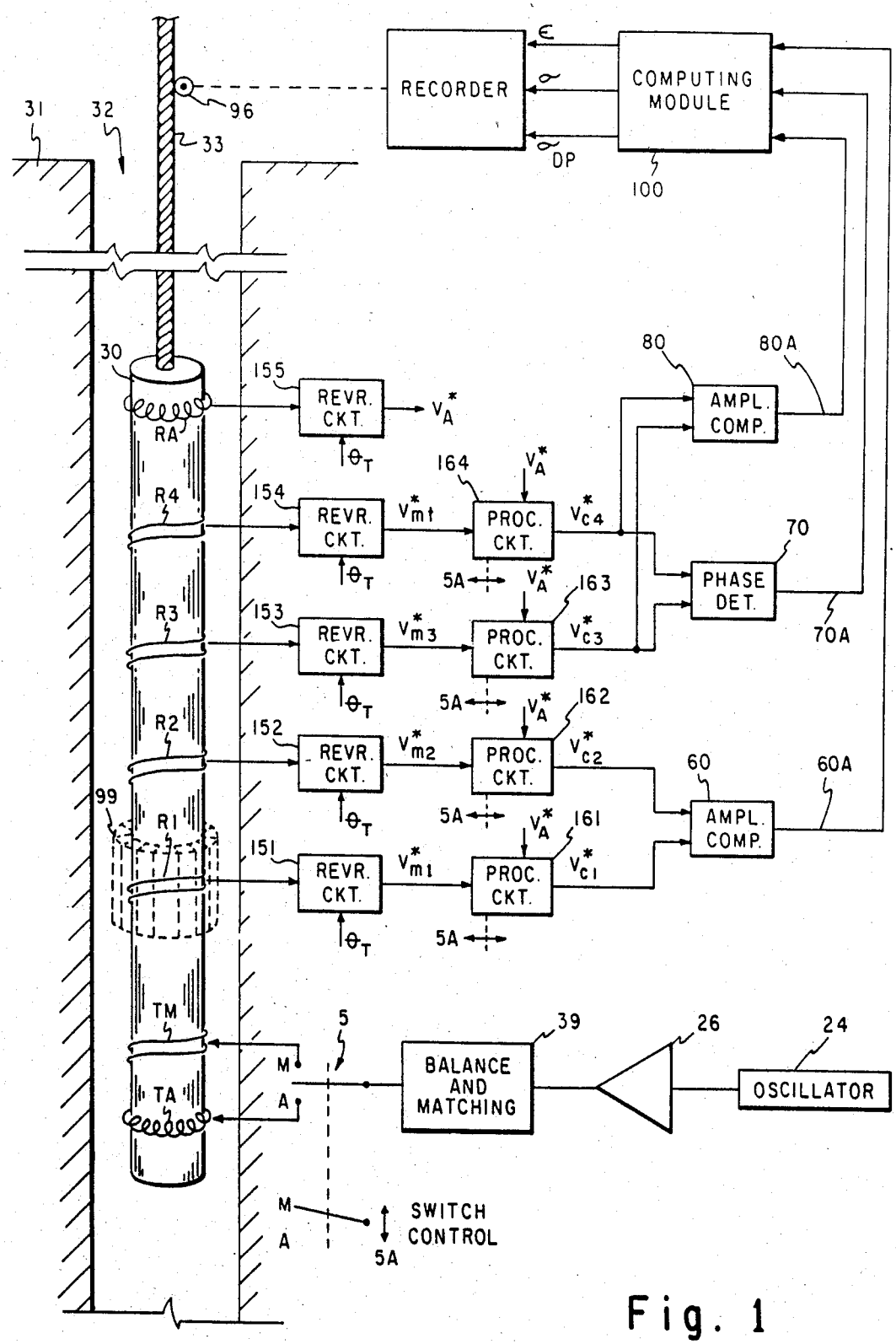
FIG. 1 is a block diagram, partially in schematic form, of an embodiment of a logging apparatus in accordance with the invention, and which can be used to practise the method of the invention.

Referring to FIG. 1, there is shown an embodiment of an apparatus in accordance with the invention, and which can be used for practicing the method of the invention, for investigating subsurface formations 31 traversed by a borehole 32. The borehole 32 may be filled with air or, more typically, drilling mud which may be either water-based mud or oil-based mud. Also, the borehole may be open or cased with a non-conductive material. The investigating apparatus or logging device 30 is suspended in the borehole 32 on an armored cable 33, the length of which substantially determines the relative depth of the device 30. The cable length is controlled by suitable means at the surface such as a drum and winch mechanism (not shown). The armored cable 33 is rewound on the drum to raise the device 30 toward the surface as formation characteristics are measured. Depth measurements are provided by a measure wheel 96 which is rotated as a result of contact with cable 33. Pulses provided by rotation of measure wheel 96 are applied to a recorder to provide a record of the depths at which measurements are being taken.

The logging device 30 includes a main transmitter antenna $T_M$, an auxiliary transmitter antenna $T_A$, four main receiver antenna coils including a pair of "close" receiver coils $R_1$ and $R_2$, and a pair of "far" receiver coils $R_3$ and $R_4$, and an auxiliary receiver antenna $R_A$. The transmitters and receivers are mounted over (and insulated from) a metal cylindrical pipe in the logging device that carries wires to and/or from the coils and may also contain electronic components of the logging device. The pipe helps prevent interference at the coils from the wires and/or components therein.

The main transmitter and receiver coils comprise two turns wound around the axis of the logging device, these coils therefore transmitting or receiving (as the case may be) primarily transverse electric energy in the manner of vertical magnetic dipoles. The auxiliary transmitter and receiver each comprise a toroidal solenoid disposed around the axis of the logging device, the toroidal solenoids transmitting or receiving (as the case may be) primarily transverse magnetic mode energy. The main transmitter and receiver coils of all embodiments are preferably provided with shields (shown as dashed lines 99 surrounding $R_1$) of the type described in the copending U.S. application Ser. No. 368,922.

The transmitter antennas are driven by a circuit which includes an oscillator 24 that generates a radio frequency signal in the range of 10 MHz–100 MHz. The output of oscillator 24 is amplified by amplifier 26 and then coupled to the transmitter antennas via a balance and matching network 39.

The transmitter energizing signal is coupled to either the main transmitting antenna $T_M$ or the auxiliary transmitting antenna, $T_A$, depending upon the position of a switch 5 that can be controlled (5A) from the surface of the earth. The outputs of the main receiver antennas, $R_1$, $R_2$, $R_3$ and $R_4$, and the auxiliary receiver antenna, $R_A$, are coupled to receiver circuits 151 through 155, respectively. Each of the receiver circuits generates output signals that respectively represents the complex voltage (i.e., the amplitude and phase of the voltage) received at its respective antenna. The outputs of the receiver circuits 151 through 154 are respectively coupled to processing circuits 161 through 164 in accordance with the invention. The complex voltage output of the receiver circuits 151 through 154 are respectively designated $V_{M1}^*$, $V_{M2}^*$, $V_{M3}^*$ and $V_{M4}^*$, and the output of receiver circuit 155 is designated $V_A^*$. The complex voltage output of processing circuits 161 through 164 are respectively designated $V_{C1}^*$, $V_{C2}^*$, $V_{C3}^*$ and $V_{C4}^*$. Each receiver circuit receives, as a reference, the phase $\phi_T$ of the transmitter signal, and it is with respect to this phase that the phase of the voltage induced in the receiver is determined by a phase detector. The receiver also typically includes a circuit for detecting the amplitude of the induced voltage. The nature of the receiver circuits for obtaining the receiver voltage (before processing thereof in accordance with the present invention) is not considered an inventive feature hereof, and is described only in sufficient detail to facilitate understanding of the present invention. Reference can be made, for example, to the above-referenced U.S. Pat. No. 4,209,747 for a more detailed description of receiver circuitry. In that patent there is also described a technique for "sharing" of certain receiver circuitry by switching back and forth between receiver antennas, and it will be understood that such technique can be employed in conjunction with the present invention with regard to receiver and/or processing circuitry. For ease of explanation, however, each receiver hereof is illustrated as having its own receiver circuit.

Before describing the processing in detail, the technique to be employed will be described in general terms. At a given receiver pair, the measured relative attenuation and phase as between two receivers can be utilized to obtain the dielectric constant and the conductivity of adjacent formations through which the electromagnetic energy has propagated. [In actuality, and as noted above, one can advantageously employ the attenuation measured at one pair of receivers and the phase measured at another pair of receivers in obtaining formation dielectric constant and/or conductivity—see the above referenced U.S. Pat. No. 4,209,747.] The differential measurements of attenuation and phase, for each receiver pair, can be obtained after determination of the complex voltage (i.e., the amplitude and phase of the voltage) at each individual receiver. Consistent with the principles of the present invention, in the described embodiment the measured complex voltage at each main receiver, $V_M^*$, is corrected in the processing circuitry to remove the portion thereof contributed by the transverse magnetic mode component, the latter being a function of the voltage obtained from the auxiliary receiver, $V_A^*$. The resultant corrected complex voltage at each receiver, designated $V_c^*$, can then be utilized to obtain differential attenuation and phase measurements from which, in turn, dielectric constant and conductivity can be obtained.

Applicant has determined that the corrected voltage at each main receiver $V_c^*$, that is due to the desired magnetic dipole signal from the main transmitter (and which excludes the spurious transmitted and received transverse magnetic mode component) can be represented as $$V_c^* = V_M^* - \frac{V_M^{*'}}{V_A^{*'}}(V_A^*) \qquad (1)$$

where $V_M^*$ and $V_A^*$ are respectively the measured voltage at the particular main receiver and the auxiliary receiver when the main transmitter $T_M$ is energized, and $V_M^{*'}$ and $V_A^{*'}$ are respectively the measured voltages at the particular main receiver and the auxiliary receiver when the auxiliary transmitter $T_A$ is energized. (In the notation hereof, the superscript asterisk represents a complex quantity. The superscript prime indicates generally that the auxiliary transmitter is energized, and the absence of the superscript prime indicates generally that the main transmitter is energized.) Since the first term on the right-hand side of the equation represents the total complex voltage at the particular main receiver, the second term can be considered an error signal that is representative of the contribution to the total received complex voltage at the particular main receiver from the transverse magnetic mode component. This error signal is seen to be the product of $V_A^*$ and the fraction $$\frac{V_M^{*'}}{V_A^{*'}},$$

which represents the relative fractional sensitivity to the transverse magnetic mode of the main receiver as compared to the auxiliary receiver (both taken when the auxiliary transmitter is energized to generate primarily the transverse magnetic mode component).

Each complex voltage of equation (1) can be expressed in terms of its magnitude and phase, which gives $$|V_c|e^{j\theta_c} = |V_M|e^{j\theta_M} - \frac{|V_M'|e^{j\theta_{M'}}}{|V_A'|e^{j\theta_{A'}}}|V_A|e^{j\theta_A} \qquad (2)$$

$$= |V_M|e^{j\theta_M} - \frac{|V_M'||V_A|}{|V_A'|}e^{j(\theta_{M'} + \theta_A - \theta_{A'})}$$

Equating the real and imaginary parts gives:

real
$$|V_c|\cos\theta_c = |V_M|\cos\theta_M - \frac{|V_M'||V_A|}{|V_A'|}\cos(\theta_{M'} + \theta_A - \theta_{A'}) \qquad (3)$$

imaginary
$$|V_c|\sin\theta_c = |V_M|\sin\theta_M - \frac{|V_M'||V_A|}{|V_A'|}\sin(\theta_{M'} + \theta_A - \theta_{A'}) \qquad (4)$$

Dividing the two previous expressions, gives:

$$\tan\theta_c = \frac{|V_M|\sin\theta_M - \frac{|V_M'|\,|V_A|}{|V_A'|}\sin(\theta_M' + \theta_A - \theta_A')}{|V_M|\cos\theta_M - \frac{|V_M'|\,|V_A|}{|V_A'|}\cos(\theta_M' + \theta_A - \theta_A')} \quad (5)$$

$\theta_c$ can then be determined as the arc tan of the previous expression. With $\theta_c$ known, either of the above expressions equating the real or the imaginary parts can then be solved to obtain $|V_c|$. For example, from (3)

$$|V_c| = \frac{|V_M|\cos\theta_M}{\cos\theta_c} - \frac{|V_M'|\,|V_A|\cos(\theta_M' + \theta_A - \theta_A')}{|V_A'|\cos\theta_c} \quad (6)$$

In operation of the system of FIG. 1, assume that the transmitter selection switch 5 is in position A so that the auxiliary transmitter $T_A$ is energized. In this situation, voltage $V_A^{*\prime}$ is obtained from receiver circuit 155, and voltages $V_{M1}^{*\prime}$ through $V_{M4}^{*\prime}$ are obtained from the receiver circuits 151 through 154. (In each case, the complex quantity set forth represents the determination of an amplitude and phase, as described above, and to be treated further hereinbelow).

When the transmitter selection switch 5 is in position M, the voltage $V_A^*$ is obtained from receiver circuit 155, and the voltages $V_{M1}^*$ through $V_{M4}^*$ are respectively obtained from receiver circuits 151 through 154.

The processing circuits 161 through 164 utilize the described voltages to obtain corrected voltages $V_{C1}^*$ throught $V_{C4}^*$ in accordance with the relationships set forth above. The processing circuits of the embodiments hereof can be implemented, for example, by special purpose analog or digital circuitry or by general purpose computing means such as a digital microprocessor. It will be understood that the processing can be performed downhole or at the surface of the earth or at a remote location. In the present embodiments a digital microprocessor, such as a model Z-80 manufactured by Zilog Corporation, is shown as being utilized to implement each or all of the processing circuits 161 through 164. The microprocessor is programmed to generate values of $|V_c|$ and the phase $\theta_c$ as a function of the magnitudes and phases received at each main receiver and the auxiliary receiver, respectively, during operation with $T_A$ and $T_M$ successively energized (in any order); i.e., as a function of $|V_m|$, $\theta_M$, $|V_A|$, $\theta_A$, $|V_M'|$, $\theta_M'$, $|V_A'|$ and $\theta_A'$.

Figure 2:
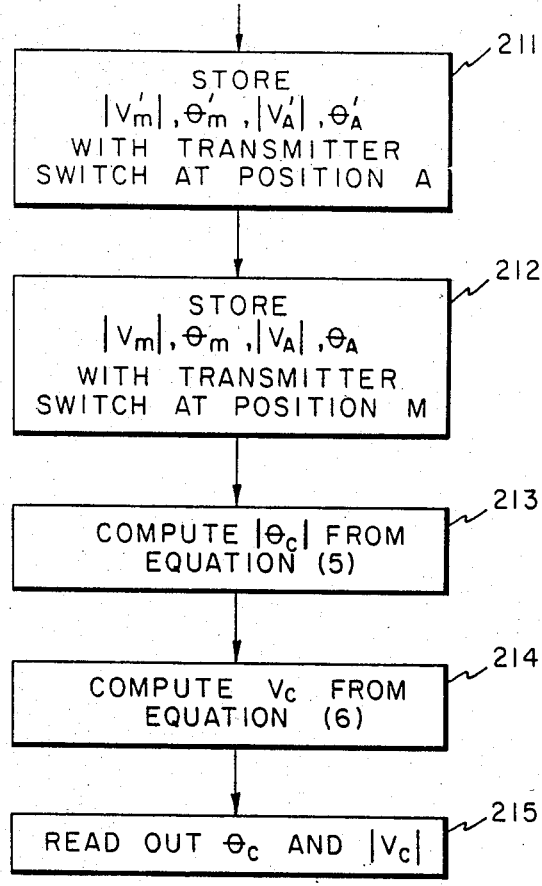
FIG. 2 is a flow diagram of the routine of the processing circuitry of FIG. 1.

FIG. 2 shows a flow diagram of the processor routine for generating the corrected amplitude and phase as implemented by the processing circuits of FIG. 1. It will be understood that multiple digital processing circuits can be employed or, preferably, a single processor can be shared to obtain corrected input voltages for each receiver channel. Analog-to-digital conversion is implemented prior to processing. A block 211 represents the storage of the signal characteristics $|V_M'|$, $\theta_M'$, $|V_A'|$, and $\theta_A'$, these being obtained while the transmitter selection switch 5 is in position A (the position of the transmitter switch being input to the processing circuitry by means not shown). The block 212 represents the storage, while the main transmitter $T_M$ is energized (switch position M) of the signal characteristics $|V_M|$, $\theta_M$, $|V_A|$, and $\theta_A$. The block 213 then represents the computation of $\theta_c$, as a function of the listed inputs using equation (5), and the block 214 represents the computation of $|V_c|$, as a function of the listed inputs, using equation (6). $|V_c|$ and $\theta_c$ are then read out, as represented by the block 215, and digital-to-analog conversion can then be implemented before subsequent processing.

Referring again to FIG. 1, amplitude comparator circuit 60 functions to measure the relative attenuation of the corrected amplitudes from receivers $R_1$ and $R_2$ and provides an amplitude ratio signal ($A_2/A_1$), where $A_2$ and $A_1$ are peak corrected amplitudes from the receivers $R_2$ and $R_1$ respectively. A phase detector circuit 70 functions to measure the difference in phase between the corrected phases from receivers $R_3$ and $R_4$. The corrected amplitudes from receivers $R_3$ and $R_4$ may also be applied to a second amplitude comparator circuit 80 which is used in deriving an "ultra-deep conductivity" measurement, as described in the above-referenced U.S. Pat. No. 4,209,747. (Any of the uncorrected or corrected signals, whether used for subsequent processing or not, can of course be recorded or stored as desired.)

For ease of illustration, the described transmitters, receivers, and associated circuitry are illustrated as being set apart from device 30, although such circuitry is generally located within the logging device. The circuitry is electrically coupled to surface instrumentation, including a computing module 100, through conductors 60A, 70A and 80A which are included within the armored cable 33.

The computing module 100 combines the relative attenuation signal provided by amplitude comparator 60 and the phase difference signal provided by phase detector 70 to derive dielectric constant and conductivity values for the formation at a particular depth of investigation in the surrounding formation. Also, the output signal of amplitude comparator 80 can be combined with the derived dielectric constant value to obtain an ultra-deep conductivity value for the formations. The calculated values of dielectric constant and conductivity are applied to a recorder 95 which also receives depth indicating signals from the measure wheel 96. The recorder 95 provides a log of dielectric constant values and conductivity values for the formations surrounding the borehole as a function of depth.

Figure 3:
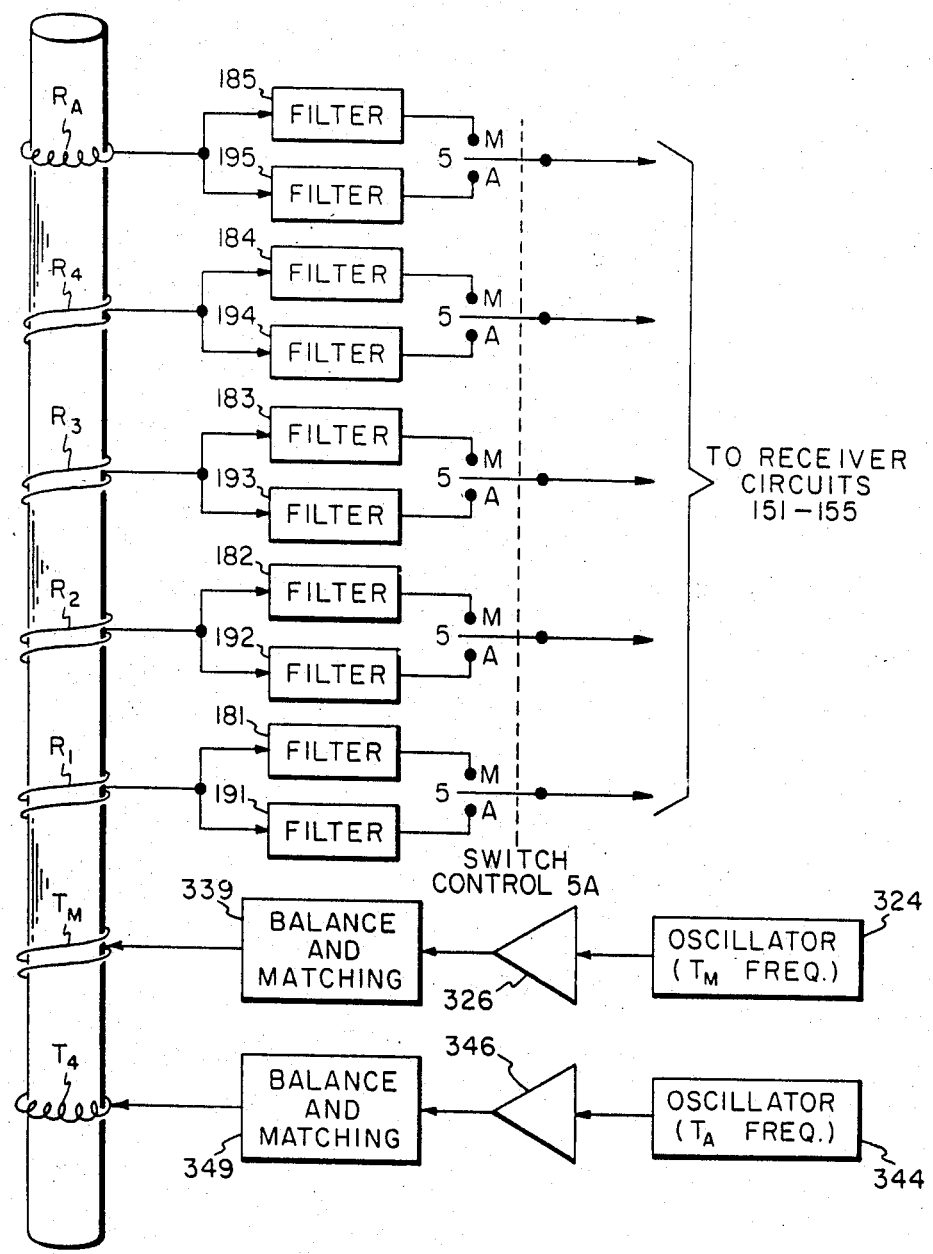
FIG. 3 is a block diagram, partially in schematic form, of another embodiment of a logging apparatus in accordance with the invention, and which can be used to practise the method of the invention.

Referring to FIG. 3, there is illustrated an embodiment of the invention that has an auxiliary transmitter and receiver (as in the FIG. 1 embodiment), but wherein the main transmitter and the auxiliary transmitter are operated simultaneously. In this case, discrimination between the energy from the main transmitter and the auxiliary transmitter is achieved by employing different energizing frequencies for these transmitters. Oscillator 324 generates the signal at the $T_M$ frequency that is applied to transmitter $T_M$ via amplifier 326 and circuit 339. Oscillator 344 generates the signal at the $T_A$ frequency that is applied to transmitter $T_A$ via amplifier 346 and oscillator 344. The frequencies employed should be close enough to each other to result in similar fields, but sufficiently separated to allow discrimination. For example, if the auxiliary transmitter frequency was selected as 25.000 MHz, a main transmitter frequency of about 25.010 MHz would be suitable. The outputs of the receivers are frequency separated by filters 181–185, which pass the $T_M$ frequency, and filters 191–195 which pass the $T_A$ frequency. In the present case, the switches 5 (controlled by switch control 5A, as in FIG. 1) couple one or the other of the filtered receiver signals to a respective receiver circuit (151-155 of FIG. 1), so that a single receiver circuit is shared for each receiver. The outputs of the receiver circuits can then be processed by the processing circuits as described in conjunction with FIGS. 1 and 2. In this case, the signals $|V_M'|$, $\theta_M'$, $|V_A'|$ and $\theta_A'$ are obtained via filters 191–195, and the signals $|V_M|$, $\theta_M$, $|V_A|$ and $\theta_A$ are obtained via filters 181–185.

Figure 4:
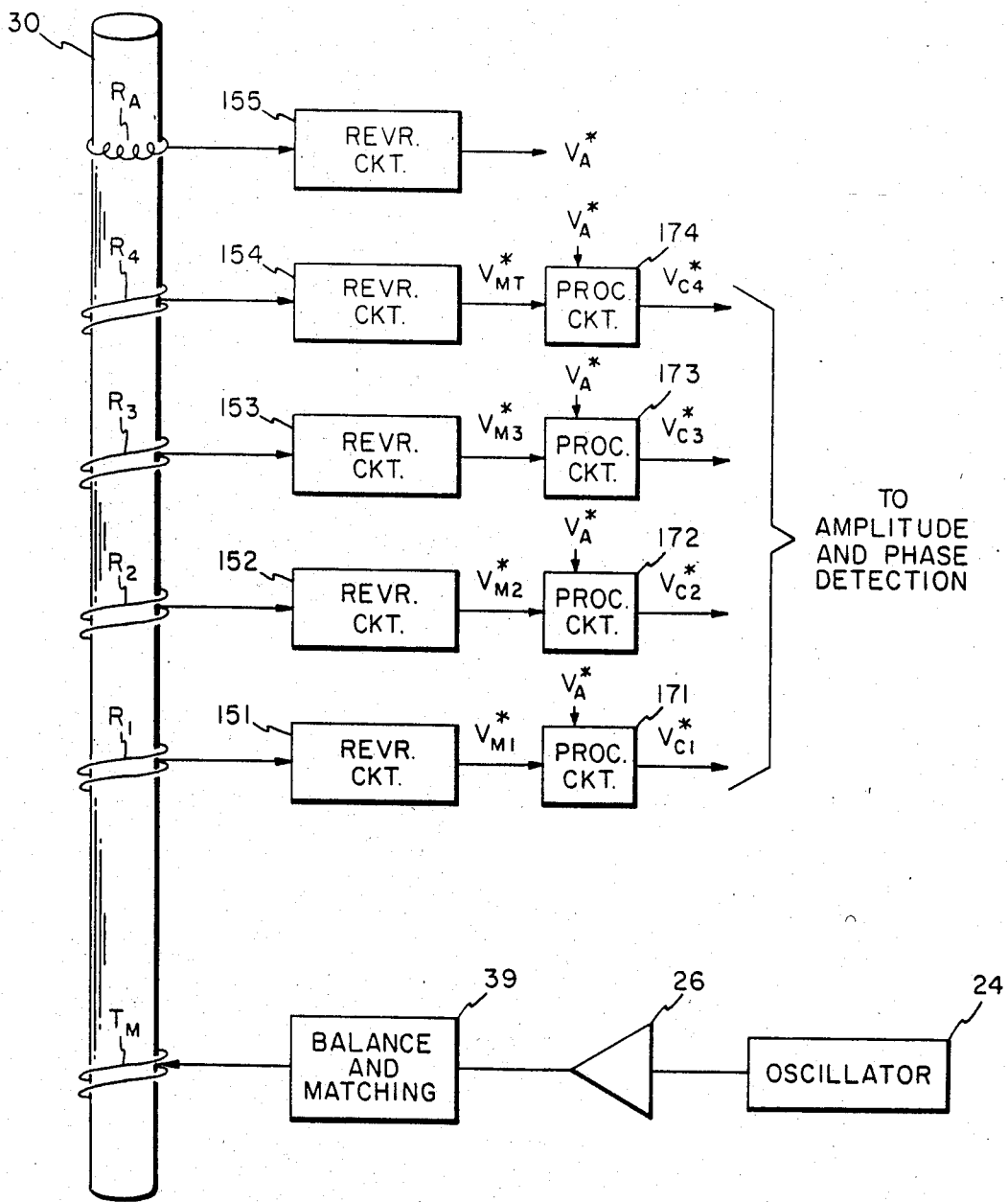
FIG. 4 is a block diagram, partially in schematic form, of another embodiment of a logging apparatus in accordance with the invention, and which can be used to practise the method of the invention.

Referring to FIG. 4, there is shown another embodiment of the invention wherein an auxiliary receiver, $R_A$, is again employed, but wherein there is no auxiliary transmitter. In this embodiment, the transverse magnetic mode component of the electromagnetic signal is again detected and used by processing circuits (represented, in this embodiment, by blocks 171 through 174) to correct for the transverse magnetic component received at the main receivers. In this case, however, equation (1) can be expressed as $$V_c^* = V_M^* - K^* V_A^* \tag{7}$$

where $K^*$ is a complex quantity representative of the relative fractional sensitivity to the transverse magnetic mode of the particular main receiver as compared to the auxiliary receiver. (In the embodiment of FIG. 1, and the equation (1), $K^*$ was considered to be dynamically determined as $V_M^{*\prime}/V_A^{*\prime}$.) The value of $K^*$ may be determined, for example, by precalibration uphole wherein the relative sensitivities of the auxiliary and main receivers to the transverse magnetic mode component of the electromagnetic signal is determined by generating a signal rich in such components (e.g. with a torodial solenoid, as used in the embodiment of FIG. 1), and determining the response. It will be understood that alternative techniques could be employed for approximating the constant $K^*$.

Expressing each complex voltage of equation (7) in terms of its magnitude and phase, gives $$|V_c|e^{j\theta_c} = |V_M|e^{j\theta_M} - |K| |V_A|e^{j(\theta_A + \theta_K)} \tag{8}$$

Equating the real and imaginary parts gives:

real
$$|V_c|\cos\theta_c = |V_M|\cos\theta_M - |K| |V_A|\cos(\theta_A + \theta_K) \tag{9}$$

imaginary
$$|V_c|\sin\theta_c = |V_M|\sin\theta_M - |K| |V_A|\sin(\theta_A + \theta_K) \tag{10}$$

Dividing the previous expressions, gives $$\tan\theta_c = \frac{|V_M|\sin\theta_M - |K| |V_A|\sin(\theta_A + \theta_K)}{|V_M|\cos\theta_M - |K| |V_A|\cos(\theta_A + \theta_K)} \tag{11}$$

$\theta_c$ can then be determined as the arc tan of the previous expression. With $\theta_c$ known, either of the expressions (9) or (10) can then be used to obtain $|V_c|$. For example, from (9):

$$|V_c| = \frac{|V_M|\cos\theta_M - |K| |V_A|\cos(\theta_A + \theta_K)}{\cos\theta_c} \tag{12}$$

The processing circuits 171 through 174 utilize the described voltage to obtain corrected voltages $V_{C1}^*$ through $V_{C4}^*$ in accordance with the relationships set forth. In this case, the microprocessor is programmed to generate values of $|V_c|$ and the phase $\theta_c$ as a function of the magnitudes and phase received at each main receiver and the auxiliary receiver, respectively; i.e., as a function of $|V_M|$, $\theta_M$, $|V_A|$, and $\theta_A$.

Figure 5:
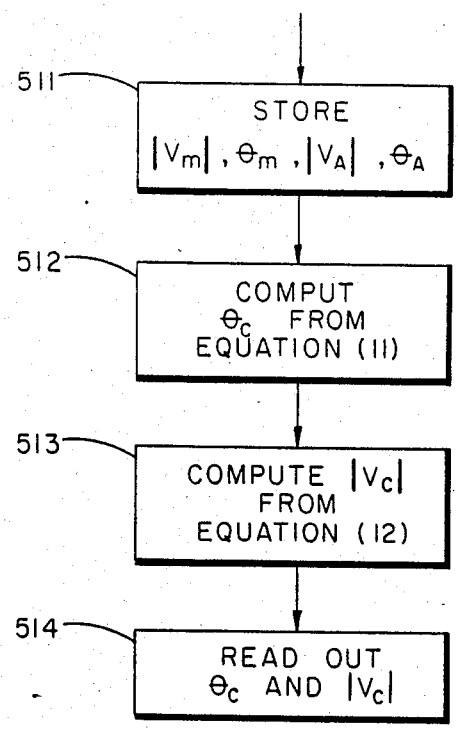
FIG. 5 is a flow diagram of the routine of the processing circuitry of FIG. 3.

FIG. 5 shows a flow diagram of the processor routine for generating the corrected amplitude and phase as implemented by the processing circuits of FIG. 4. A block 511 represents the storage of the signal characteristics $|V_M|$, $\theta_M$, $|V_A|$, and $\theta_A$. The block 512 then represents the computation of $\theta_c$, as a function of the listed inputs, using equation (11), and the block 513 represents the computation of $|V_c|$, as a function of the listed inputs using equation (12). $|V_c|$ and $\theta_c$ can then be read out, as represented by the block 514.

Figure 6:
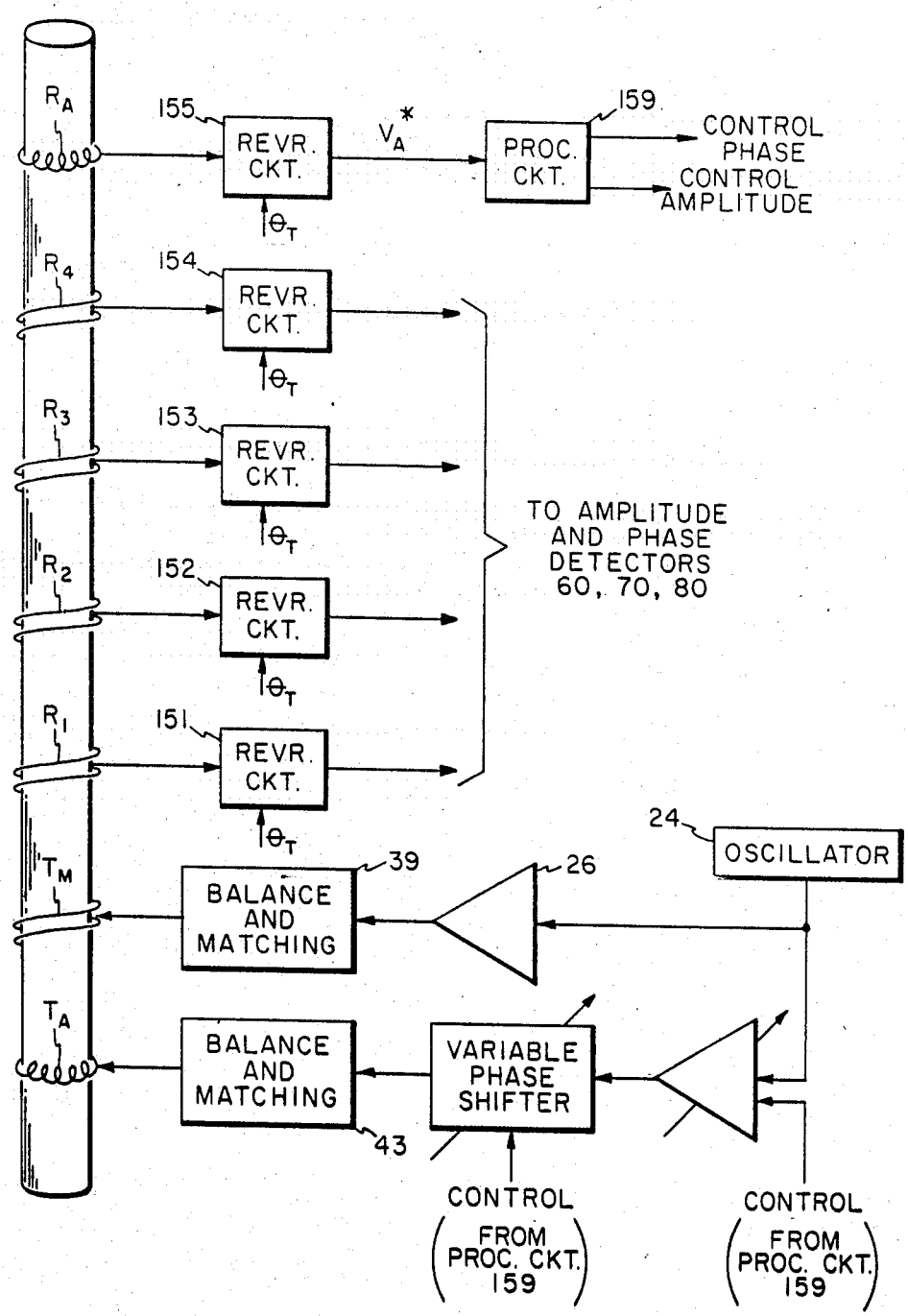
FIG. 6 is a block diagram, partially in schematic form, of another embodiment of a logging apparatus in accordance with the invention, and which can be used to practise the method of the invention.
Figure 7:
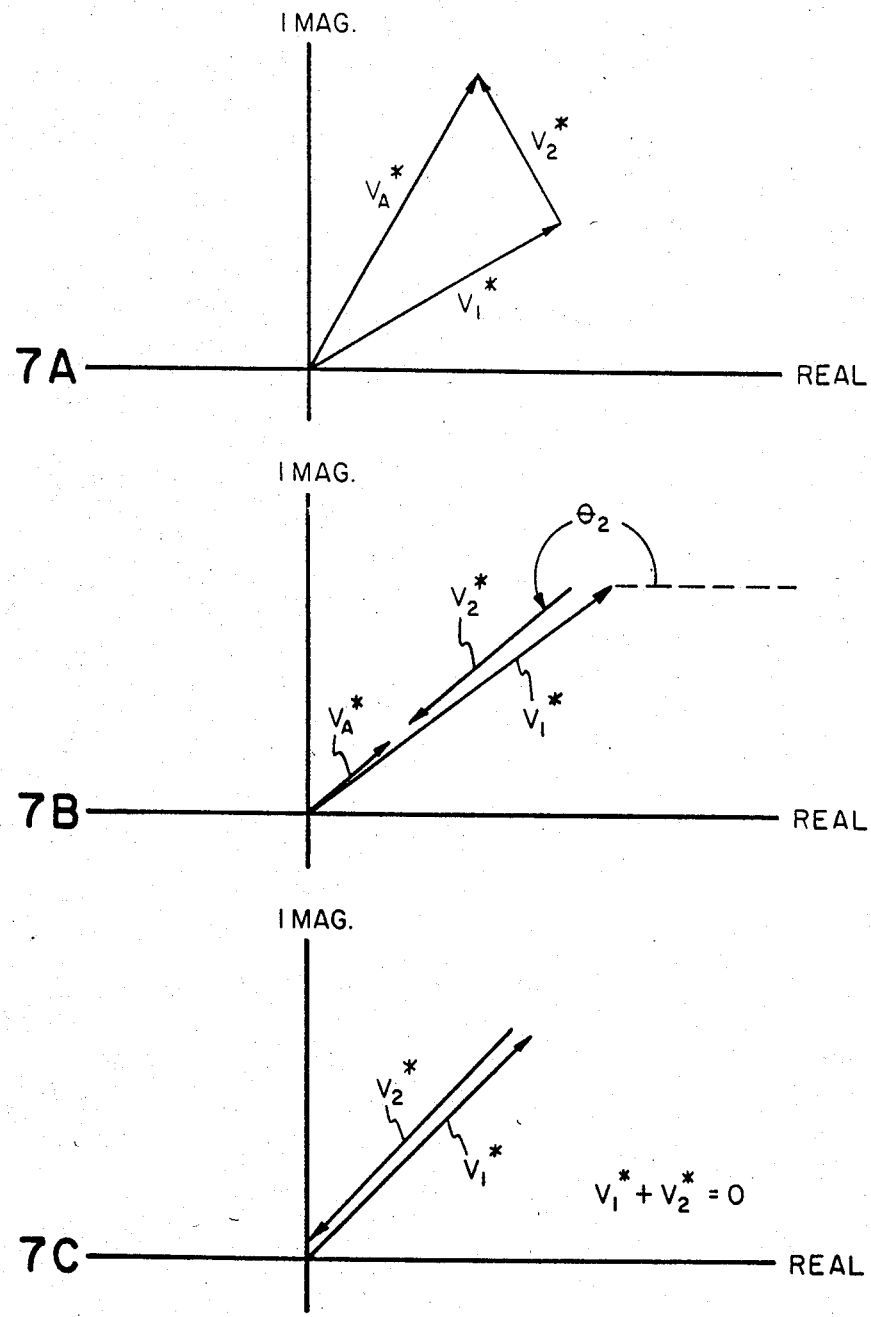
FIG. 7 illustrates vector diagrams that are useful in understanding operation of the FIG. 6 embodiment.

FIG. 6 illustrates another embodiment of the invention. The configuration of the transmitters and receivers is the same as in FIG. 1. In the FIG. 6 embodiment, the main transmitter $T_M$ is energized by the oscillator 24, via amplifier 26 and balance and matching network 39. The auxiliary transmitter $T_A$ is energized by the oscillator 24 via variable gain amplifier 41, variable phase shifter 42, and balance and matching network 43. The receiver outputs are coupled to receiver circuits 151 through 155, as described in conjunction with FIG. 1. In the present embodiment, however, correction is implemented by sensing the nature of the spurious mode that is unavoidably part of the signal from the main transmitter, and adjusting the auxiliary transmitter to produce wave energy having an amplitude and phase that tends to cancel the spurious mode. FIG. 7 illustrates the technique vectorially. Assume that the energy from the main transmitter $T_M$ causes a voltage $V_1^*$ in the auxiliary receiver $R_A$ and that energy from the auxiliary transmitter $T_A$ causes a voltage $V_2^*$ in the auxiliary receiver $R_A$ (it being assumed that the toroidal coil $R_A$ is primarily sensitive to the spurious transverse magnetic components of the electromagnetic energy). The total of these two voltages at the auxiliary receiver $R_A$ is represented as $V_A^*$; i.e., the vectorial sum of $V_1^*$ and $V_2^*$. This is shown in vector diagram 7A. $V_1^*$ is fairly constant in amplitude and phase, particularly when antenna shields are employed and the main component of the transverse magnetic mode energy is related to skewing of the shield conductors. The phase and amplitude of $V_2^*$ are respectively controlled by variable phase shifter 42 and variable gain amplifier 41. The objective is to reduce $V_A^*$ to as close to zero as possible. This is done by first determining the phase shift of $V_2^*$ which causes $V_2^*$ to be in phase opposition with $V_1^*$. This is achieved by varying the phase of $V_2^*$ until a minimum value of $|V_A|$ is obtained. Diagram 7B illustrates this situation, $\theta_2$ being the desired reference phase of $V_2^*$. Now, with the phase angle of $V_2^*$ maintained at $\theta_2$, the magnitude of $V_2^*$, i.e. $|V_2|$, is incremented until a minimum or a null is reached for $|V_T|$ (diagram 7C).

In FIG. 6, the technique just described is implemented by processing circuit 159 which, as in previous embodiments, may be a digital microprocessor. FIG. 8 shows a flow diagram of the processor routine for generating phase control and amplitude control that are respectively coupled to variable phase shifter 42 and variable gain amplifier 41 of FIG. 6. Block 801 represents the incrementing of the reference phase control of variable phase shifter 42, and block 802 represents the output of this phase control to the variable phase shifter 42 (it being assumed that conventional D/A and/or A/D conversions are implemented as required). $|V_A|$ is stored (block 803), and the present reference phase control is saved if the current value of absolute value of $V_A$ is a minimum (block 804). Determination is then made (decision diamond 805) as to whether or not a full cycle (360°) of increments has been implemented. If not, block 801 is re-entered, and the loop 820 continues until the full cycle is complete. The block 806 is then entered, this block representing the setting of the reference phase control (input to variable phase shifter 42) to a value which yielded the minimum $|V_A|$. The block 807 is then entered, this block representing the incrementing of the reference gain control, which is output to variable gain amplifier 41 (block 808). As before, $|V_A|$ is stored (block 809) and, in this case, the reference gain control which resulted in a minimum $|V_A|$ is saved (block 810). A determination is then made (decision diamond 811) as to whether or not a full predetermined range of gain control values have been tried or a null has been obtained. If not, block 807 is re-entered and loop 825 continues until either a null is obtained or the full range of reference gain control values have been tried. The block 812 is then entered, and reference gain control is set to the value which yielded the minimum or null $|V_A|$.

The routine of FIG. 8 can be performed downhole at the beginning of a logging run, and if desired, done periodically to adjust the transmitting antenna energizing parameters. It will be understood that if particular characteristics of behavior of the spurious mode are known a priori, a look-up table of amplitude and phase correction values can also be employed in conjunction with circuitry of FIGS. 6 and 8 in the implementation of the spurious mode minimization technique.

The invention has been described with reference to particular embodiments, but variations within the spirit and scope of the invention will occur to those skilled in the art. For example, it will be understood that processing could be controlled from the surface of the earth, or implemented at the surface. Further, in some embodiments the uncorrected signals can be recorded, and correction signals can be computed at the surface of the earth or at a location remote from borehole site.

We claim:

1. A method for borehole logging; comprising the steps of:
transmitting electromagnetic energy, having a transverse magnetic component, from a transmitter location in a borehole;
receiving transmitted energy at a receiver location in the borehole spaced from the transmitter location;
detecting the transverse magnetic electromagnetic energy component received in the region of the receiver location; and
generating transverse magnetic electromagnetic energy which tends to cancel the detected transverse magnetic component.

2. The method as defined by claim 1, wherein said generated transverse magnetic electromagnetic energy is generated at an auxiliary transmitter location adjacent the transmitter location.

3. The method as defined by claim 1, wherein the detected transverse magnetic component is received at an auxiliary receiver location adjacent the receiver location.

4. The method as defined by claim 2, wherein the detected transverse magnetic component is received at an auxiliary receiver location adjacent the receiver location.

5. The method as defined by claim 1, further comprising the step of determining the amplitude and phase of the energy received at the receiver location.

6. The method as defined by claim 4, further comprising the step of determining the amplitude and phase of the energy received at the receiver location.

7. The method as defined by claim 1, wherein the step of detecting the transverse magnetic component received in the region of the receiver location comprises detecting the amplitude of the transverse magnetic component, the generated transverse magnetic electromagnetic energy being a function of the detected amplitude.

8. The method as defined by claim 4, wherein the step of detecting the transverse magnetic component received in the region of the receiver location comprises detecting the amplitude of the transverse magnetic component, the generated transverse magnetic electromagnetic energy being a function of the detected amplitude.

9. The method as defined by claim 7, wherein the phase and amplitude of the generated transverse magnetic electromagnetic energy are adjusted to minimize the detected amplitude.

10. The method as defined by claim 8, wherein the phase and amplitude of the generated transverse magnetic electromagnetic energy are adjusted to minimize the detected amplitude.

11. A method for logging formations surrounding a borehole, comprising the steps of:
transmitting electromagnetic energy, which includes a transverse magnetic component, from a main transmitter in the borehole;
transmitting transverse magnetic electromagnetic energy from an auxiliary transmitter in the borehole;
receiving transverse magnetic components of the transmitted energy from both transmitters at an auxiliary receiver in the borehole spaced from the transmitters;
generating an auxiliary receiver signal in response to the energy received at the auxiliary receiver during simultaneous transmission from the transmitters;
adjusting the energy transmitted from the auxiliary transmitter in accordance with the auxiliary receiver signal;
receiving transmitted energy from both transmitters at a main receiver in the borehole spaced from the transmitters; and
generating a main receiver signals in response to the energy received at the main receiver during simultaneous transmission from the transmitters; after adjustment of the energy transmitted from auxiliary transmitter, said main receiver signals being indicative of properties of said formations.

12. The method as defined by claim 11 further comprising the step of determining the amplitude or phase of the energy received at the main receiver.

13. The method as defined by claim 11 wherein said step of adjusting the energy transmitted from the auxiliary transmitter includes detecting of the amplitude of the auxiliary receiver signal, and adjusting the energy transmitted from the auxiliary transmitter as a function of the detected amplitude.

14. The method as defined by claim 12 wherein said step of adjusting the energy transmitted from the auxiliary transmitter includes detecting of the amplitude of the auxiliary receiver signal, and adjusting the energy transmitted from the auxiliary transmitter as a function of the detected amplitude.

15. The method as defined by claim 13, wherein the phase and amplitude of the energy transmitted from the auxiliary transmitter are adjusted to minimize the detected amplitude.

16. The method as defined by claim 14, wherein the phase and amplitude of the energy transmitted from the auxiliary transmitter are adjusted to minimize the detected amplitude.

17. Apparatus for determining properties of formations surrounding a borehole, comprising:
an elongated logging device moveable in the borehole;
a main transmitter and an auxiliary transmitter mounted on the device;
a main receiver and an auxiliary receiver mounted on the device in spaced relationship to the transmitters;
means for energizing the main transmitter with electromagnetic energy;
means for energizing the auxiliary transmitter with transverse magnetic electromagnetic energy;
means for adjusting the energizing of the auxiliary transmitter in accordance with the transverse magnetic electromagnetic energy component received at the auxiliary receiver.

18. Apparatus as defined by claim 17 wherein said means for energizing the auxiliary transmitter includes means for adjusting the phase and amplitude of the energy transmitted by the auxiliary transmitter to minimize the transverse magnetic component received at the auxiliary receiver.

19. Apparatus as defined by claim 17, wherein said main transmitter and receiver each comprise a coil wound around the axis of the logging device, and the auxiliary transmitter and receiver each comprise a toroidal coil wound around the axis of said logging device.

20. Apparatus as defined by claim 18, wherein said main transmitter and receiver each comprise a coil wound around the axis of the logging device, and the auxiliary transmitter and receiver each comprise a toroidal coil wound around the axis of said logging device.

21. Apparatus as defined by claim 17, further comprising means for determining the amplitude and phase of the energy received at the main receiver, the properties of the formations being obtained from said amplitude and phase.

22. Apparatus as defined by claim 20, further comprising means for determining the amplitude and phase of the energy received at the main receiver, the properties of the formations being obtained from said amplitude and phase.

23. Apparatus for determining properties of formations surrounding a borehole, comprising:
a logging device moveable through the borehole and including an elongated electrically conductive pipe;
a main transmitter coil and an auxiliary transmitter coil, each wound on an insulating medium around the axis of the pipe;
a plurality of main receiver coils, each wound on an insulating medium around the axis of the pipe in spaced relation to each other and to the transmitter coils;
an auxiliary receiver coil wound on an insulating medium around the axis of the pipe in spaced relation to the transmitter coils;
means for energizing the main transmitter coil with electromagnetic energy;
means for energizing the auxiliary transmitter coil with transverse magnetic electromagnetic energy; and
means for adjusting the energizing of the auxiliary transmitter in accordance with the transverse magnetic electromagnetic energy component received at the auxiliary coil.

24. Apparatus as defined by claim 23, wherein said means for energizing the auxiliary transmitter coil includes means for adjusting the phase and amplitude of the energy transmitted by the auxiliary transmitter coil to minimize the transverse magnetic component received at the auxiliary receiver coil.

25. Apparatus as defined by claim 23, wherein said auxiliary transmitter coil and said auxiliary receiver coil each comprise a toroidal coil.

26. Apparatus as defined by claim 24, wherein said auxiliary transmitter coil and said auxiliary receiver coil each comprise a toroidal coil.

27. Apparatus as defined by claim 23, further comprising means for determining the amplitude and phase of the energy received at the main receiver coils, the properties of the formations being obtained from said amplitude and phase determinations.

28. Apparatus as defined by claim 26, further comprising means for determining the amplitude and phase of the energy received at the main receiver coils, the properties of the formations being obtained from said amplitude and phase determinations.

* * * * *